July 26, 1960   J. P. CRAIN ET AL   2,946,625
WHEEL FOR MARSH VEHICLE
Filed Feb. 13, 1959

INVENTORS
J. P. CRAIN
A. H. CRAIN

BY Kimmel & Crowell
ATTORNEYS

United States Patent Office 2,946,625
Patented July 26, 1960

2,946,625

WHEEL FOR MARSH VEHICLE

John P. Crain and Albert H. Crain, both of Grand Chenier, La.

Filed Feb. 13, 1959, Ser. No. 793,012

1 Claim. (Cl. 301—41)

This invention relates to a buoyant wheel for marsh vehicles.

In vehicles which are moved over marshy and muddy ground it is essential that the vehicle be made buoyant, and to accomplish this result the wheels are made hollow and sufficiently large in diameter and in width so that the vehicle will float in water. It is desirable also that the wheels also be so made that they will not slip in muddy or marshy ground, and at the same time will move relatively smoothly over hard ground.

It is, therefore, an object of this invention to provide a hollow buoyant wheel for a marsh vehicle which will support the vehicle in marshy and muddy ground and at the same time provide adequate traction means to hold the wheel against slippage.

Another object of this invention is to provide in a buoyant wheel traction means on the periphery of the wheel which will not clog up with sticky dirt and will operate equally as well on soft or hard ground.

With the above and other objects in view, our invention consists in the arrangement, combination and details of construction disclosed in the drawing and specification, and then more particularly pointed out in the appended claim.

Figure 1:
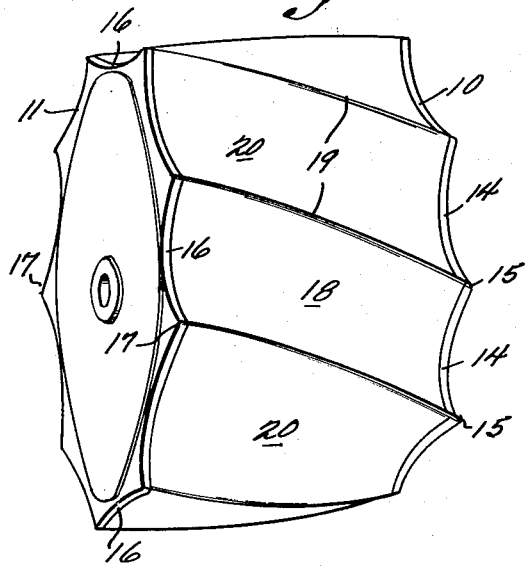
Figure 1 is a perspective view of a buoyant wheel constructed according to an embodiment of this invention.
Figure 2:
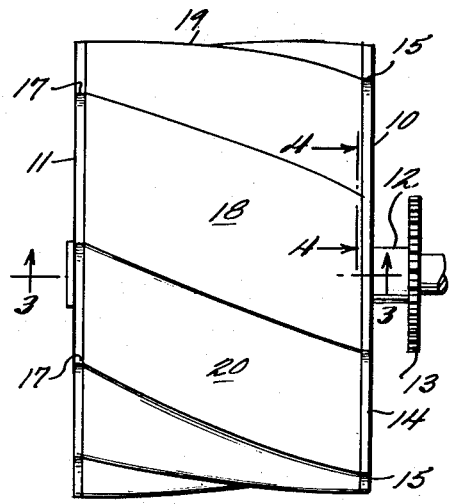
Figure 2 is a detail side elevation of the wheel.
Figure 3:
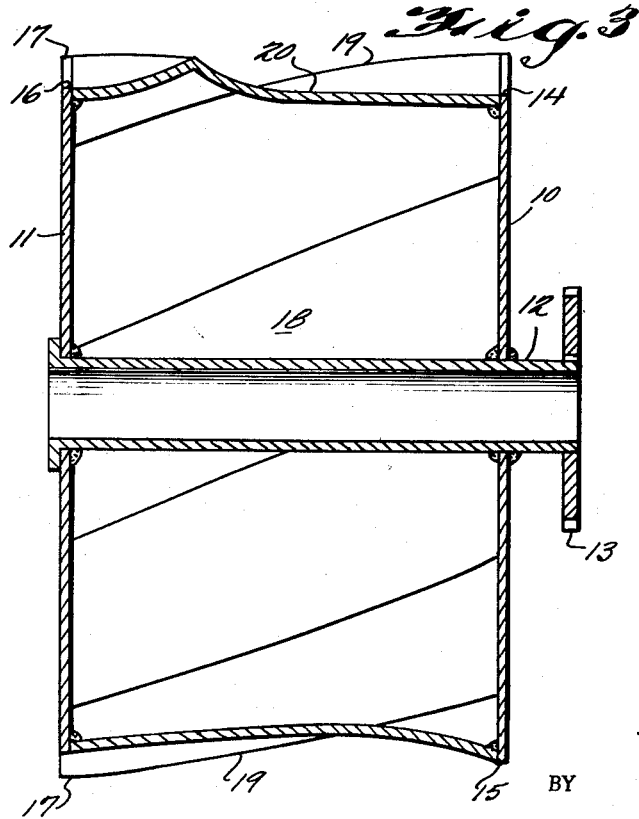
Figure 3 is a sectional view taken on the line 3—3 of Figure 2.
Figure 4:
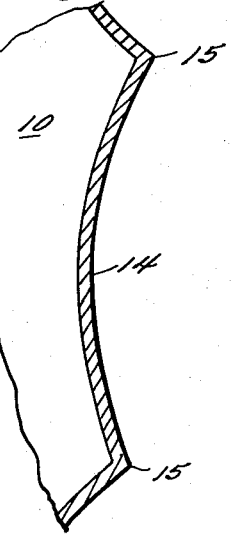
Figure 4 is a fragmentary sectional view taken on the line 4—4 of Figure 2.

Referring to the drawing, the numerals 10 and 11 designate generally a pair of side walls or plates which are disposed in parallel spaced apart relation. A tubular hub 12 extends through the center of each of said plates 10 and 11, and is fixedly secured thereto. The hub 12 projects outwardly from wall 10 and has fixedly secured thereon a gear or sprocket wheel 13. The wheel 13 is adapted to be connected to the power source of the vehicle by either a chain or gear connection (not shown).

A plurality of regular equi-spaced semi-circular recesses 14 are formed in the outer peripheral edge of plate 10. The recesses 14 delineate a plurality of equi-spaced peripheral points 15 that project outwardly from the outer edge portion of the plate 10. The plate 11 is likewise provided with a plurality of equi-spaced semi-circular recesses 16 in the outer peripheral edge thereof. The recesses 16 delineate a plurality of equi-spaced peripheral points 17 that project outwardly from the outer edge portion of the plate 11. The points 15 are staggered with respect to the points 17. Likewise, the recesses 14 are staggered with respect to the recesses 16.

A circumferential wall, generally indicated at 18, extends between and is secured to the outer edge of the plates 10 and 11. The wall 18 is provided with a plurality of equi-spaced ground engaging anticlinal peak members 19 about the outer periphery thereof. The peak members 19 each have one edge thereof coextensive with a respective one of the points 15 on the plate 10 and extend spirally across the outer periphery of the wall 18. The other edge of the peak members 19 is coextensive with a respective one of the points 17 on the plate 11. By reason of the spiral construction of the peak members 19, when the wheel is running over hard ground at least a portion of more than one of the peak members will always be in contact with the ground. This will prevent the wheel from having a bumpy movement, as would be the case if the peaks were right angularly disposed with respect to the plates.

The anticlinal peak members 19 have spiral flutes 20 disposed between each adjacent peak member 19. Each of the flutes 20 extend from one of the recesses 14 to a respective one of the recesses 16 and provide a means whereby mud or soft ground, upon turning of the wheel, will be forced to move laterally with respect to the wheel. The dirt, therefore, will not tend to stick within the flutes as is the case where wheels of this type are provided with lugs or other conventional traction elements for engagement against the ground. In short, the flutes are self cleaning so that the wheel may be used in many different places, even though the moisture characteristics may vary widely.

The wheel herein disclosed is a buoyant element so that when four of these wheels are used to support a vehicle, the vehicle will be capable of operation over either hard ground or over areas of deep mud and slime found in swampy areas.

Having thus described the preferred embodiment of the invention, it should be understood that numerous structural modifications and adaptations may be resorted to without departing from the scope of the appended claim.

What is claimed is:

In a wheel construction for marsh vehicles, a pair of spaced annular side plates, a tubular hub, said hub extending through the center of each of said plates and fixedly secured thereto, said side plates each having a plurality of regular equi-spaced semicircular recesses extending inwardly from the outer peripheral edge thereof and delineating a plurality of equi-spaced peripheral points projecting radially outwardly from the outer edge portion of said side plates, said points on one of said plates being staggered with respect to said points on the other of said plates, said recesses on said one plate being staggered with respect to said recesses on said other plate, and a circumferential wall extending between and secured to said peripheral edges of said plates, said wall comprising a series of spirally arranged ground engaging peak members extending between said plates in circumferentially spaced relation, with each of said members having an edge extending from one of said points on said one of said side plates to one of said points on said other of said side plates, said series of peak members delineating a series of circumferentially spaced spiral flutes, each of said flutes extending between one of said recesses on said one plate to a respective one of said recesses on said other plate, said side plates and said members forming a closed watertight buoyant body for movement over semi-fluid terrain.

References Cited in the file of this patent

UNITED STATES PATENTS

| | | |
|---|---|---|
| 499,514 | Buchanan | June 13, 1893 |
| 686,822 | Macphail | Nov. 19, 1901 |
| 700,215 | Macphail | May 20, 1902 |
| 2,560,384 | Crain | July 10, 1951 |

FOREIGN PATENTS

| | | |
|---|---|---|
| 903,074 | France | Jan. 5, 1945 |